No. 653,932. Patented July 17, 1900.
H. D. MENTZEL & J. REISER.
MARKING BREAD.
(Application filed July 28, 1899.)
(No Model.)

Witnesses:
Jas. E. Hutchinson.
Henry C. Hazard.

Inventors.
Henry D. Mentzel and John Reiser, by
Crindle & Russell, his Attorneys

UNITED STATES PATENT OFFICE.

HENRY D. MENTZEL AND JOHN REISER, OF BALTIMORE, MARYLAND, ASSIGNORS TO THE ELKRIDGE MANUFACTURING COMPANY, OF SAME PLACE.

MARKING BREAD.

SPECIFICATION forming part of Letters Patent No. 653,932, dated July 17, 1900.

Application filed July 28, 1899. Serial No. 725,348. (No model.)

*To all whom it may concern:*

Be it known that we, HENRY D. MENTZEL and JOHN REISER, of the city of Baltimore, in the State of Maryland, have invented certain Improvements in the Marking of Bread, of which the following is a full, clear, and exact description, reference being had to the accompanying drawings, making a part of this specification, in which—

Figure 1:
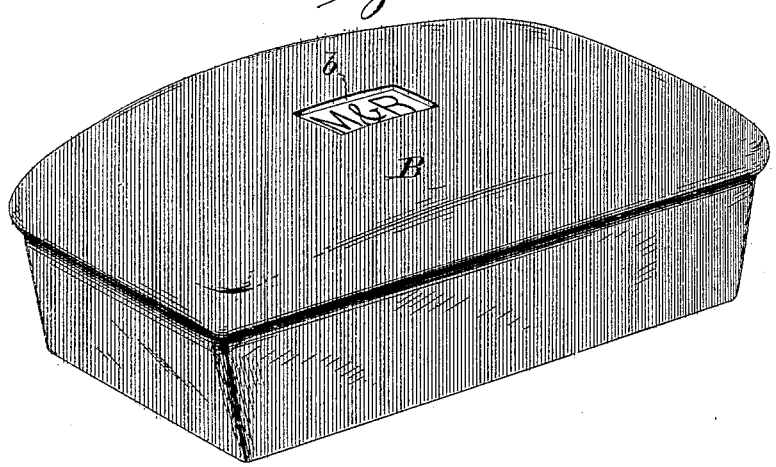
Figure 2:
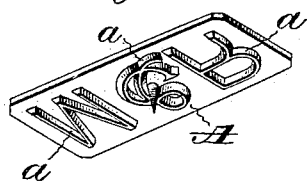
Figure 3:
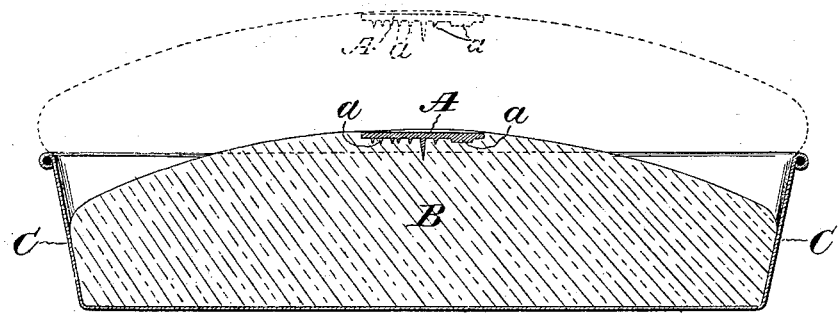

Figure 1 is a perspective view of a loaf of bread marked in accordance with our improved method. Fig. 2 is a like view of the plate employed in the marking; and Fig. 3 is a vertical longitudinal section of an unbaked loaf in position within a baking-pan, with the marking-plate in place, the dotted lines showing the top outlines of the loaf, with the plate, when baked.

Letters of like name and kind refer to like parts in each of the figures.

In the manufacture of bread it is desirable that its origin may be indicated by some distinguishing-mark upon each loaf, and to such end unbaked loaves have had impressed upon their soft surfaces by means of a stamp or die words, letters, or characters; but during the process of baking it was found that the swelling of the dough would distort or entirely obliterate the impression, so as to prevent the object sought. Another method employed for marking has been by pasting a label upon the bread; but aside from the untidiness of such means labels are so easily counterfeited as to render them of little value for such purpose.

The object of our invention is to enable loaves of bread to be plainly and uniformly marked with any desired word, letter, or character which in no manner injures the bread and cannot be effaced without mutilation of the same; and to such end our said invention consists in the method employed, substantially as and for the purpose hereinafter specified.

In the carrying of our invention into practice we employ a plate A, preferably metal, upon one side or face of which is formed in relief or intaglio one or more letters or characters $a\ a$, that constitute the mark selected, or the shape of the plate alone may be depended upon to form the desired mark. When the dough that is to form the loaf of bread B has been placed in the pan C, the plate A is placed face downward upon and pressed into the surface of such dough, preferably until entirely buried therein, with its upper face flush with the surface of said dough, after which the whole is placed within a suitably-heated oven and there remains until the baking operation is completed.

The weight of the marking-plate A is gaged so that it will maintain its position and neither sink into nor be pressed out of the dough, and after the removal of the bread from the oven said plate may be easily lifted from position, when it will be found that within the cavity $b$ left by the removal there has been clearly and distinctly formed the reverse of the letters or characters $a\ a$, which are easily distinguishable. Further prominence is given the mark by the action of the plate, which by preventing full action of the heat upon the surface covered thereby causes such protected surface to have a different lighter color than that of the remaining portion of the top of the loaf.

Having thus set forth our invention, what we claim is—

1. The method of marking bread which consists in placing upon the upper surface of an unbaked loaf, a loose plate that is heavy enough to remain in place and light enough not to sink into the loaf below the desired position, then baking such loaf with such plate in position and, lastly, removing said plate, substantially as and for the purpose described.

2. The method employed for marking a loaf of bread, which consists in applying to the upper surface of the unbaked loaf, a loose plate having a shape adapted to produce the desired mark, then baking such bread with such plate in position and, lastly, removing the said plate, whereby the appearance of a portion of the loaf under the plate is made different from the rest of the plate, substantially as and for the purpose described.

In witness whereof we have hereunto set our hands this 26th day of July, 1898.

HENRY D. MENTZEL.
JOHN REISER.

Witnesses:
WM. T. HOWARD,
HARRY E. FEE.